United States Patent
Kersting

(10) Patent No.: US 11,657,109 B2
(45) Date of Patent: *May 23, 2023

(54) PLATFORM DEVICE FOR PROVIDING QUANTITATIVE COLLECTIVE KNOWLEDGE

(71) Applicant: Patrick Faulwetter, Marina Del Rey, CA (US)

(72) Inventor: Björn Kersting, Braunfels (DE)

( * ) Notice: Subject to any disclaimer, the term of this patent is extended or adjusted under 35 U.S.C. 154(b) by 343 days.

This patent is subject to a terminal disclaimer.

(21) Appl. No.: 15/100,443

(22) PCT Filed: Jun. 25, 2014

(86) PCT No.: PCT/DE2014/100211
§ 371 (c)(1),
(2) Date: Sep. 6, 2016

(87) PCT Pub. No.: WO2015/078436
PCT Pub. Date: Jun. 4, 2015

(65) Prior Publication Data
US 2017/0004218 A1    Jan. 5, 2017

(30) Foreign Application Priority Data

Nov. 28, 2013 (WO) ................ PCT/DE2013/100399

(51) Int. Cl.
*G06F 16/955* (2019.01)
*G06F 16/28* (2019.01)
(Continued)

(52) U.S. Cl.
CPC .......... *G06F 16/955* (2019.01); *G06F 16/285* (2019.01); *G06F 16/954* (2019.01);
(Continued)

(58) Field of Classification Search
CPC ... H04L 67/1097; H04L 63/123; H04L 43/08; G06F 17/30; G06F 21/60; G06F 21/78;
(Continued)

(56) References Cited

U.S. PATENT DOCUMENTS 6,260,064 B1 * 7/2001 Kurzrok ................ G06F 16/958
709/224
7,031,952 B1 * 4/2006 Heumann .............. G06N 5/022
(Continued)

FOREIGN PATENT DOCUMENTS

FR    2981766 A1 * 4/2013 .......... G06F 11/1662
JP    5691229 B2 * 4/2015 ............... G06F 3/06
(Continued)

OTHER PUBLICATIONS

Basic Support for Cooperative Work, Version 4.4, Oct. 2007, OrbiTeam Software GmbH & Co. KG, Bonn, Germany.
(Continued)

*Primary Examiner* — Augustine K. Obisesan
(74) *Attorney, Agent, or Firm* — Bachman & LaPointe, P.C.

(57) ABSTRACT

With regard to a platform device (100) placed on a web-site and networked with a plurality of ID-detectable users or participants for the purpose of collecting and processing items of information stored on a plurality of in each case code-identifiable and in each case theme-dependent storage sites (110) of a platform by said users or participants, there is achieved modifiability of the stored information by the network participants according to strictly predefined processing criteria and with the creation of swarm knowledge in that the storage sites (110) formed on the platform are subdivided into a plurality of themes and are in each case formed by a dual unit (DuU), said dual unit (DuU) comprising in each case a first storage site 111 provided with
(Continued)

initial information assigned to a predefined theme and formulated by an initial participant and adapted so as to be non-editable by any other individual user-participant and a second storage site (112) which is assigned to the first storage site (111) and which is editable by any of the individual user-participants and is adapted for acceptance of the input of additional information by the plurality of user-participants such as is relevant to the initial information stored at the first storage site (111).

20 Claims, 4 Drawing Sheets

(51) Int. Cl.
  *G06F 16/954* (2019.01)
  *G06F 16/958* (2019.01)
  *G06F 16/9535* (2019.01)
  *G06Q 10/101* (2023.01)
  *G06N 5/022* (2023.01)

(52) U.S. Cl.
  CPC ........ *G06F 16/9535* (2019.01); *G06F 16/986* (2019.01); *G06N 5/022* (2013.01); *G06Q 10/101* (2013.01)

(58) Field of Classification Search
  CPC .. G06F 9/5077; G06F 17/30091; G06F 3/068; G06F 3/0685; B64C 2201/126; B64C 2201/146; B64C 39/024
  See application file for complete search history.

(56) References Cited

U.S. PATENT DOCUMENTS

| | | | |
|---|---|---|---|
| 7,447,807 B1* | 11/2008 | Merry | G06F 3/0604 710/8 |
| 7,962,482 B2 | 6/2011 | Handman et al. | |
| 8,127,095 B1* | 2/2012 | Colgrove | G06F 11/1435 711/162 |
| 8,612,449 B1 | 12/2013 | Cuthbert | |
| 8,645,295 B1 | 2/2014 | Dillard | |
| 9,613,321 B2 | 4/2017 | Molyneux | |
| 9,984,079 B1* | 5/2018 | Stickle | G06F 3/0685 |
| 2002/0049738 A1 | 4/2002 | Epstein | |
| 2002/0199186 A1* | 12/2002 | Ali | G11B 27/105 725/28 |
| 2003/0093423 A1* | 5/2003 | Larason | G06F 16/951 |
| 2004/0266743 A1 | 12/2004 | McMahon | |
| 2005/0097188 A1 | 5/2005 | Fish | |
| 2005/0223002 A1 | 10/2005 | Agarwal | |
| 2006/0064411 A1 | 3/2006 | Gross et al. | |
| 2006/0247944 A1 | 11/2006 | Calusinski | |
| 2006/0282304 A1 | 12/2006 | Bedard | |
| 2007/0061211 A1 | 3/2007 | Ramer | |
| 2008/0114629 A1* | 5/2008 | Pavlov | G06Q 10/08 705/347 |
| 2008/0201418 A1 | 8/2008 | Krishnan | |
| 2008/0320060 A1* | 12/2008 | Hardman | H04L 67/1001 |
| 2009/0259526 A1 | 10/2009 | Bechtel | |
| 2010/0023382 A1 | 1/2010 | Fushimi | |
| 2010/0049683 A1 | 2/2010 | Carter | |
| 2010/0115215 A1* | 5/2010 | Rosychuk | G06F 11/1456 711/162 |
| 2010/0205006 A1 | 8/2010 | Bergh | |
| 2010/0205543 A1 | 8/2010 | Von Werther | |
| 2010/0306223 A1 | 12/2010 | Lee | |
| 2011/0016179 A1 | 1/2011 | Bechtel | |
| 2011/0055017 A1 | 3/2011 | Solomon | |
| 2011/0106757 A1 | 5/2011 | Pickney | |
| 2011/0178981 A1 | 7/2011 | Bowen | |
| 2011/0231350 A1 | 9/2011 | Momma | |
| 2012/0110429 A1* | 5/2012 | Tzonis | G06Q 10/10 715/230 |
| 2013/0159289 A1 | 6/2013 | Matthews | |
| 2013/0246643 A1 | 9/2013 | Luby | |
| 2013/0247195 A1* | 9/2013 | Takahashi | G06F 21/56 726/23 |
| 2013/0339301 A1* | 12/2013 | Saito | G06F 16/21 707/649 |
| 2014/0181210 A1 | 6/2014 | Kersting | |
| 2014/0310285 A1 | 10/2014 | Chan | |
| 2014/0330831 A1 | 11/2014 | Kersting | |
| 2014/0365457 A1 | 12/2014 | Kersting et al. | |
| 2014/0372432 A1 | 12/2014 | Kersting | |
| 2015/0347480 A1 | 12/2015 | Smart | |
| 2017/0017885 A1 | 1/2017 | Kersting | |

FOREIGN PATENT DOCUMENTS

| | | |
|---|---|---|
| WO | 2013/029602 A1 | 3/2013 |
| WO | 2013/029605 A1 | 3/2013 |

OTHER PUBLICATIONS

International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.
BSCW 4.4 Manual, Nov. 2008, OrbiTeam Software GmbH & Co. KG, Bonn, Germany.
U.S. Office Action dated Jun. 26, 2019 for U.S. Appl. No. 15/100,455.
U.S. Office Action dated Nov. 19, 2019 for U.S. Appl. No. 15/100,434.
U.S. Office Action dated Jun. 6, 2019 for U.S. Appl. No. 15/100,434.
U.S. Office Action dated Feb. 26, 2019 for U.S. Appl. No. 15/100,431.
U.S. Office Action dated Aug. 21, 2019 for U.S. Appl. No. 15/100,431.
U.S. Office Action dated Mar. 20, 2020 for U.S. Appl. No. 15/100,431.
U.S. Office Action dated Nov. 26, 2018 for U.S. Appl. No. 15/100,440.
Antunes Pedro, "Reviewing the Quality of Awareness Support in Collaborative Applications", Journal of Systems and Software, 2014 (available online Nov. 15, 2013), pp. 146-169, Elsevier, Amsterdam, Netherlands.
BSCW 4.5 Manual, Jun. 2011, OrbiTeam Software GmbH & Co. KG, Bonn, Germany.
U.S. Office Action dated Mar. 29, 2022 for U.S. Appl. No. 15/100,431.

* cited by examiner

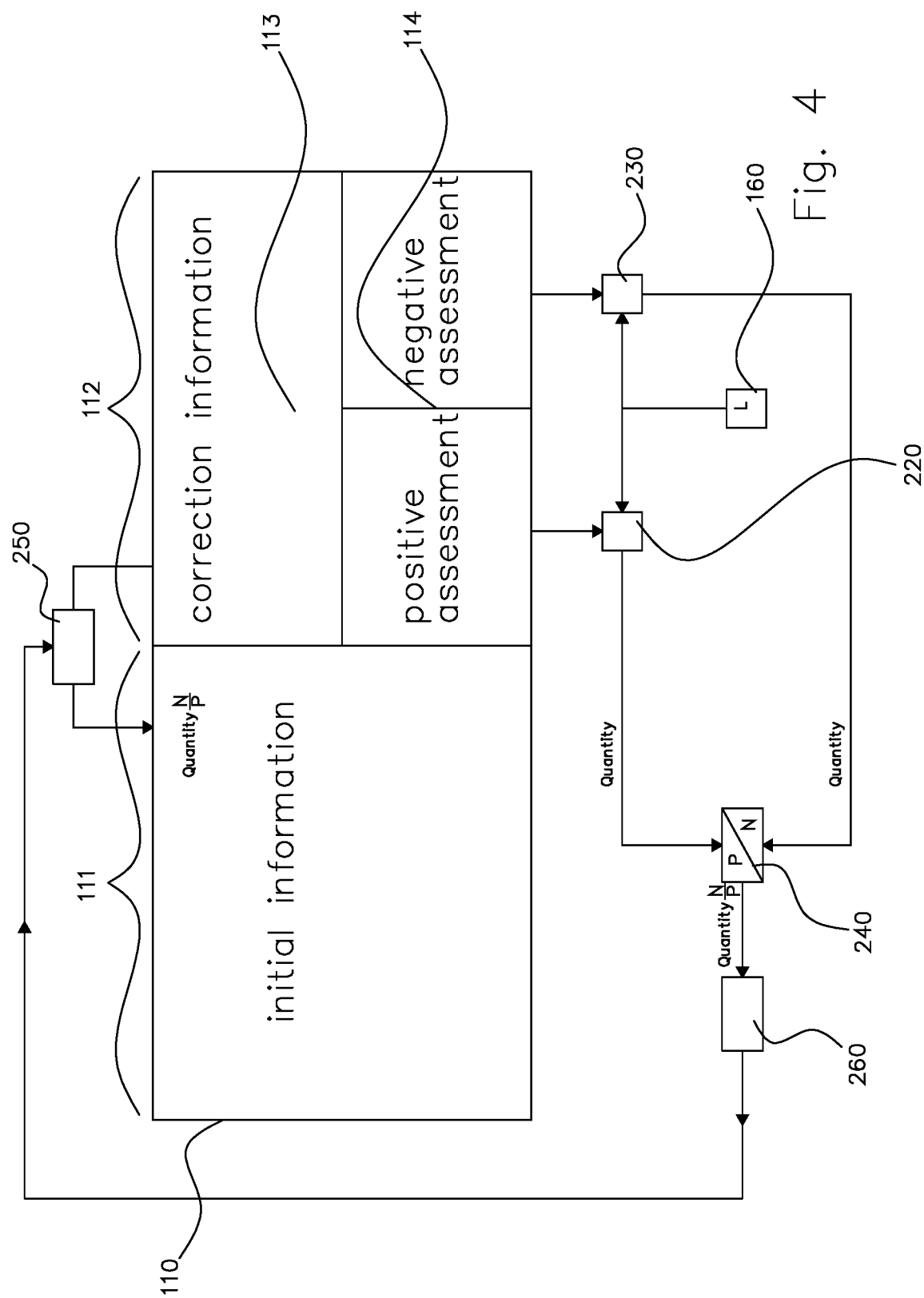

PLATFORM DEVICE FOR PROVIDING QUANTITATIVE COLLECTIVE KNOWLEDGE

BACKGROUND

The present invention relates to a platform device placed on a web-site and networked with a plurality of ID-identifiable users or participants for the purpose of collecting and processing items of information on the part of the users or participants, said information being stored at a plurality of storage sites of a platform which are in each case identifiable by means of predefined coding and are in each case assigned to a predefined theme.

Platform devices of the aforementioned type are known in the art with respect to a number of applications. They are also operated, inter alia, in the world-wide internet. However, the prior platform devices suffer from the drawback that a specific selection of presettable linkages, and linkages capable of being carried out according to predefined criteria are not realizable. This may be regarded as being due, inter alia, to the fact that the current platforms store items of information without these items of information being associated with strictly predefinable processing criteria and strictly predefinable evaluation criteria.

SUMMARY

Thus it is an object of the present invention to provide a platform device by means of which items of information providing swarm information and stored at a first storage site are utilizable by the network participants and can be added to or changed according to strictly predefined processing criteria on provision of an agreement by the network participants.

With regard to a platform device of the aforementioned type, this object is achieved in that the storage sites are subdivided on the platform into a plurality of themes and are in each case in the form of a dual unit (DuU) comprising in each case a first storage site assigned to a predefinable theme and provided with initial information formulated by an initial user-participant but not editable by any other individual user-participant, together with a second storage site which is assigned to the first storage site and is capable of being edited by the plurality of user-participants and is adapted for acceptance of inputted additional information relevant to the initial information stored at the first storage site.

Preferred embodiments of the invention are the subject matter of the subordinate claims.

With regard to the platform device of the invention, the combination of features to the effect that the storage sites are subdivided into a plurality of themes on the platform and are in each case in the form of a dual unit (DuU) comprising in each case a first storage site, assigned to a predefinable theme and provided with initial information formulated by an initial participant but not editable by any other individual user-participant, together with a second storage site assigned to the first storage site and capable of being edited by the plurality of individual user-participants and adapted for acceptance of inputted additional information relevant to the initial information stored at the first storage site has the result that the formation of dual units makes it possible for items of information relevant to very specific processing stipulations will be capable of being evaluated, processed, changed, and finally stored, while items of information of all kinds will be adapted for evaluation and processing, which items of information are subdivided according to various themes for the purpose of retrievability.

The use of a processing operation capable of being carried out by a plurality of users or participants serves the purpose of enabling initial information imported by an initial author to a first storage site of a dual unit to be rendered evaluatable and processible for the users or participants, in order to provide the initial information with a reliability value or reliability evaluation, which on termination of a processing operation carried out according to the invention is registered at the first storage site so as to be available as a public swarm evaluation for use by the users or participants.

According to a first preferred embodiment of the device of the invention, provision is made for additional information to be stored, by the users or participants, at the editable second storage site in the form of swarm values of the items of information stored at the first storage site, it being possible for the users or participants to carry out an individual evaluation by means of a predefined input, a swarm value being defined as the quantitative amount or number of inputs carried into effect by the users or participants at the second storage site.

The individual evaluations can, in particular, be subdivided into positive evaluations of the items of information stored at the first storage site and negative evaluations of the items of information stored at the first storage site, a first adding device being provided for the purpose of counting the individual inputted positive evaluations together with a memory for the purpose of saving this number to the second storage site, and a second adding device being provided for the purpose of counting the individual inputted negative evaluations together with a memory for the purpose of saving this number to the second storage site, it being possible for an individual evaluation to be inputted by all users or participants by means of a predefined input, while a positive swarm value is defined as the number of predefined inputs carried into effect at the second storage site that relate to a positive evaluation and a negative swarm value is defined as the number of predefined inputs carried into effect at the second storage site that relate to a negative evaluation.

According to an important preferred embodiment of the device of the invention, provision is made for the first adding device to be adapted to add the positive evaluations stored at the second storage site to a first number and for the second adding device to be adapted to add the negative evaluations stored at the second storage site to a second number, a first dividing device being provided for the purpose of stating the ratio of the first number to the second number in the form of a percentage value.

Furthermore, there is preferably provided a first copying device adapted to interpret the evaluations successively stored at the second storage site within a settable period of time as useful swarm information and to appropriately overwrite the relevant information previously stored at the first storage site. In this way there is created evaluation information.

According to another important and preferred embodiment of the device of the invention, there is provided a timing devise adapted to transmit, on conclusion of settable constant time intervals, reset signals to the first and second adding devices and to the first dividing device and the first copying device, in order to set the respective devices to zero on conclusion of a predefined time interval and to repeat the assigned function in a subsequent period of time of the same length.

According to an embodiment of the device of the invention that is similar to the above embodiments but conceptionally slightly different therefrom, the editable second storage site is subdivided into a contents storage site, in which additional information concerning the items of information stored at the first storage site can be imported in the form of items of information supplementary to the information stored at the first storage site, and an evaluation storage site, into which exclusively evaluations of the supplementary information stored at the second storage site can be imported, and which are subdivided into positive evaluations of the supplementary information stored at the second storage site and negative evaluations of the supplementary information stored at the second storage site.

Likewise according to an important preferred embodiment of the device of the invention, there is provided a third adding device for the purpose of counting the individual inputted positive evaluations of the supplementary information together with a memory for the purpose of saving this number to the second storage site, wherein a fourth adding device is provided for the purpose of counting the individual inputted negative evaluations of the supplementary information together with a memory for the purpose of saving this number to the second storage site, and wherein an individual evaluation can be carried into effect by the users or participants by means of a predefined input, while a positive swarm value of the supplementary information is defined as the number of predefined inputs to the second storage site relating to a positive evaluation, and a negative swarm value of the supplementary information is defined as the number of predefined inputs to the second storage site relating to a negative evaluation.

In addition, the third adding device is preferably adapted such that the positive evaluations stored at the second storage site are added to a third number within a time interval of predefined length as determined by a timing device and the fourth adding device is adapted such that the negative evaluations stored at the second storage site are added to a fourth number within a time interval of predefined length as determined by a timing device, while a second dividing device is provided for the purpose of stating the ratio of the third and fourth numbers in the form of a percentage value.

Preferably, there is likewise provided a second copying device, which, on determination, in a second decision-making device, of a predetermined ratio of positive evaluations to negative evaluations of the supplementary information stored at the second storage site, interprets the supplementary information stored at the second storage site as being assured swarm items of information and transfers the same to the first storage site.

According to another important and preferred embodiment of the device of the invention, provision is made such that the third and fourth adding devices and also the second dividing device and the second copying device are adapted so as to repeat the currently assigned function on conclusion of a timer-defined time interval of defined length in an immediately following time-period of equal length after zeroing the third and fourth numbers.

According to another embodiment of the device of the invention that is similar to, but conceptionally slightly different from, the aforementioned embodiments, the editable second storage site is subdivided into a contents storage site, in which additional information concerning items of information stored at the first storage site in the form of corrective information of the items of information stored at the first storage site can be imported, and an evaluation storage site, in which exclusively evaluations of the corrective information stored at the second storage site can be imported, which evaluations are subdivided into positive evaluations of the corrective information stored at the second storage site and negative evaluations thereof.

Likewise according to an important and preferred embodiment of the device of the invention, a fifth adding device for the purpose of counting the individual inputted positive evaluations of the corrective information and a memory is provided for the purpose of saving this number to the second storage site, and a sixth adding device is provided for the purpose of counting the individual inputted negative evaluations of the corrective information and a memory is provided for the purpose of saving this number to the second storage site, wherein an individual evaluation can be carried into effect by the users or participants by means of a predefined input, while a positive swarm value of the supplementary information is defined as the number of predefined inputs to the second storage site that correspond to a positive evaluation, and a negative swarm value of the corrective information is defined as the number of predefined inputs to the second storage site that correspond to a negative evaluation.

In addition, the fifth adding device is preferably adapted so as to add the positive evaluations stored at the second storage site to a fifth number on termination of time intervals of predefined length as stipulated by a timing device and the sixth adding device is here so as to add the negative evaluations stored at the second storage site to a sixth number on termination of the time intervals of predefined length as stipulated by the timing device, wherein a third dividing device is provided so as to state the ratio of the fifth number to the sixth number in the form of a percentage value.

Likewise there is preferably provided a third copying device, which on determination, in a third decision-making device, of a predetermined ratio of positive evaluations to negative evaluations of the corrective information stored at the second storage site, interprets the corrective information stored at the second storage site as being assured swarm information and transfers it to the first storage site and overwrites the previous relevant items of information at the first storage site.

According to another important and preferred embodiment of the device of the invention, provision is made such that the fifth and sixth adding devices and also the third dividing device and the third copying device are adapted so as to repeat the currently assigned function on conclusion of a timer-defined time interval of defined length in an immediately following time-period of equal length after zeroing the fifth and sixth numbers.

A predefined input can be realized in the case of an individual positive evaluation, for example, by inputting the Arabic number +1, and a predefined input can be realized in the case of a individual negative evaluation, for example, by inputting the Arabic number −1.

Preferably, an initial placement of a dual unit having a first storage site and a second storage site can be achieved by each participant.

An input of further items of information relevant to the information stored at the first storage site can be carried out by the plurality of user-participants successively or even simultaneously.

BRIEF DESCRIPTION OF THE DRAWINGS

The platform device of the invention is explained below with reference to preferred embodiments, which are illustrated in the Figures displayed in the accompanying drawings, in which:

FIG. 4 shows a theoretical embodiment of a dual unit (DuU) that correspond to a third preferred embodiment of the platform device 100 of the invention in the form of a block diagram.

DETAILED DESCRIPTION

The platform device 100 of the invention placed on a web-site is networkable with a plurality of ID-detectable users or participants and adapted to collect and process items of information stored at a plurality of in each case code-identifiable and in each case theme-dependent storage sites 110 of a platform by the users or participants.

The storage sites 110 subdivided into a large number of different themes are formed on the platform in each case by a dual unit (DuU), wherein a dual unit (DuU) in each case comprises a first storage site 111 that is assigned to a predefined theme and provided with initial information formulated by an initial participant but is non-editable by any other individual user-participant, and a second storage site 112 assigned to the first storage site 111, which can be edited by any of the individual user-participant and is adapted for the input of additional information by the plurality of user-participants, as is relevant to the initial information stored at the first storage site 111.

Figure 1:
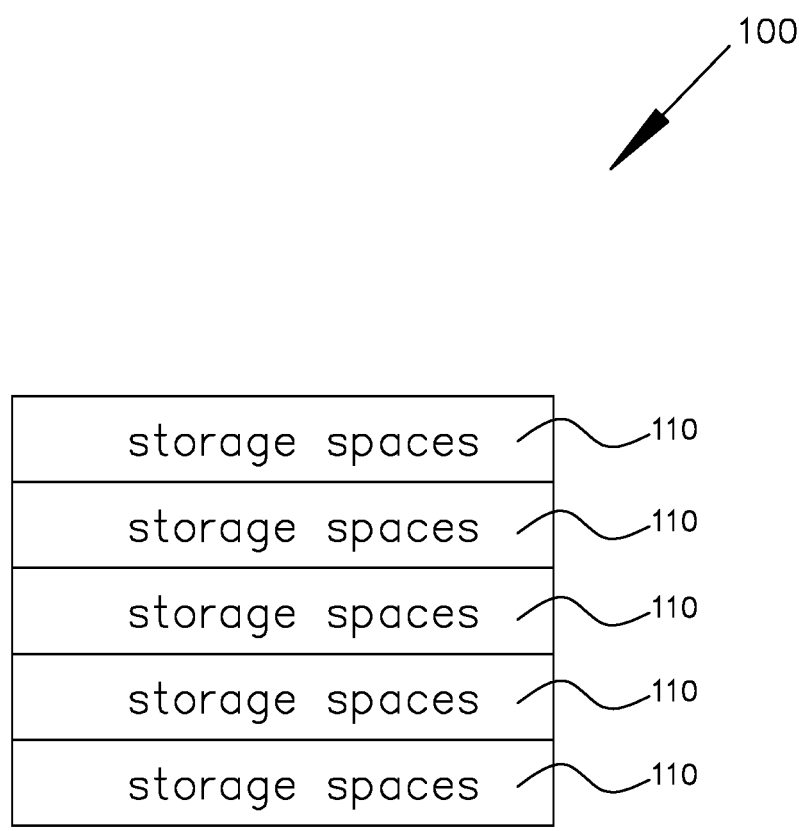
FIG. 1 shows storage sites 110 of the platform device 100 of the invention subdivided into a plurality of various themes in the form of a block diagram.

According to the embodiment of the platform device 100 of the invention shown in FIG. 1, additional information can be provided, in the form of swarm values of the items of information stored at the first storage site 111, by the users or participants in the editable second storage site 112, wherein an individual evaluation can be carried into effect by the users or participants by means of a predefined input, while a swarm value is defined as the number of predefined inputs into the second storage site 112 as are carried into effect by the plurality of users or participants.

The individual evaluations are in this case be subdivided into positive evaluations of the items of information stored at the first storage site 111 and negative evaluations, wherein there is provided a first adding device 120 for the purpose of counting the individual inputted positive evaluations, and a memory is provided for the purpose of saving this number to the second storage site 112, and there is provided a second adding device 130 for the purpose of counting the individual inputted negative evaluations, and a memory is provided for the purpose of saving this number to the second storage site 112, wherein an individual evaluation can be carried into effect by the users or participants by means of a predefined input, while a positive swarm value is defined as the number of predefined inputs into the second storage site 112 that correspond to a positive evaluation, and a negative swarm value is defined as the number of predefined inputs into the second storage site 112 that correspond to a negative evaluation.

The first adding device 120 is adapted so as to add the positive evaluations stored at the second storage site 112 to a first number and the second adding device 130 is adapted so as to add the negative evaluations stored at the second storage site 112 to a second number, while a first dividing device 140 is provided so as to state the ratio of the first number to the second number in the form of a percentage value.

A first copying device 150 is provided, which successively interprets the evaluations stored at the second storage site 112 within settable time intervals as being useful swarm information and transfers it to the first storage site 111 and overwrites the previous relevant items of information at the first storage site 111. Evaluation information is thus created in this manner.

A timing device 160 is provided, on conclusion of settable constant time intervals, on the first adding device 120, while the second adding device 130 and also the first dividing device 140 and the first copying device 150 send reset signals in order to set the associated devices to zero on conclusion of a presettable time interval and in order to repeat the currently assigned function in an immediately following time-period of equal length.

Figure 2:
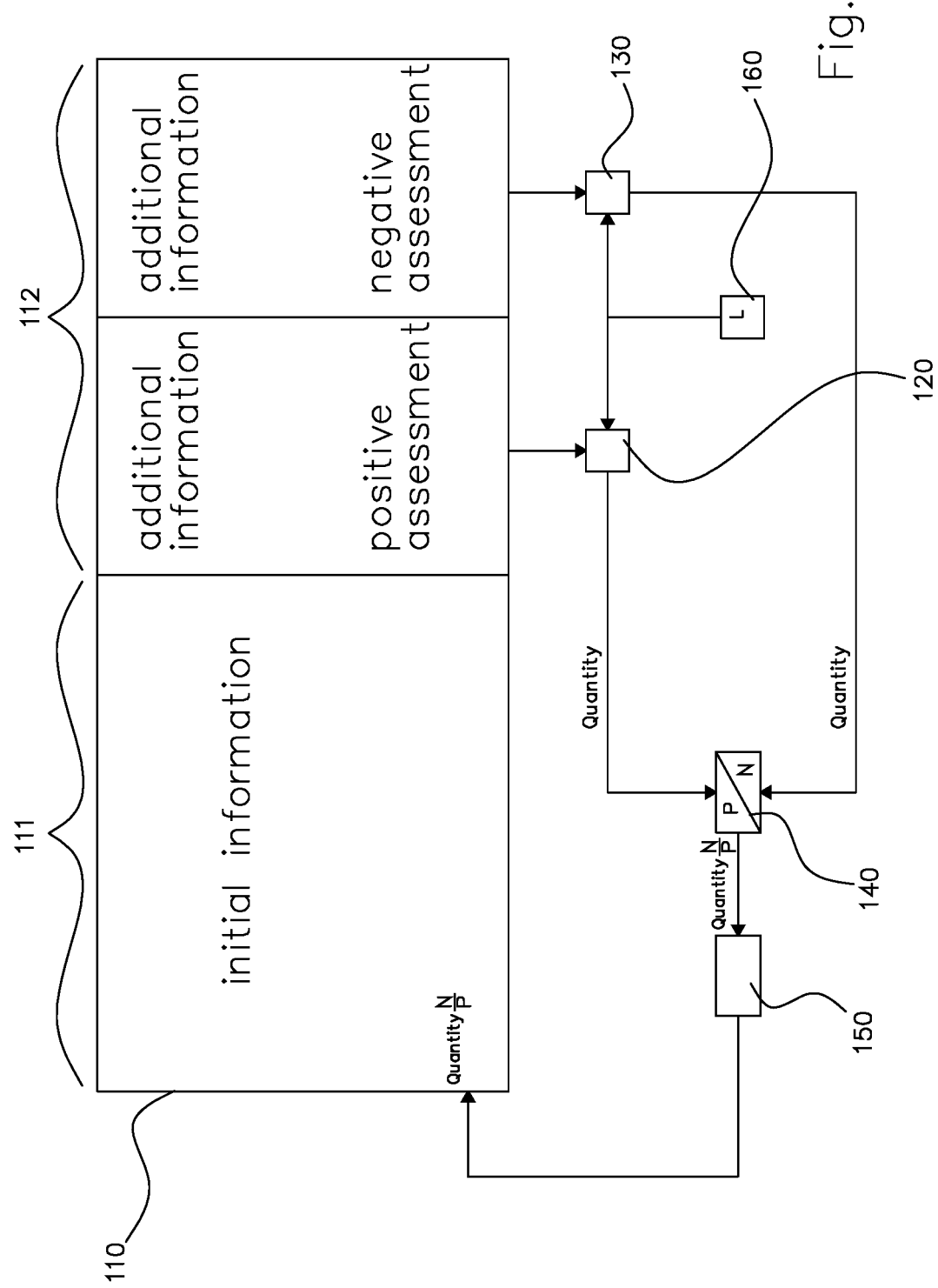
FIG. 2 shows a theoretical embodiment of a dual unit (DuU) that correspond to a first preferred embodiment of the platform device 100 of the invention in the form of a block diagram.

According to the embodiment of the platform device 100 of the invention shown in FIG. 2, the editable second storage site 112 is subdivided into a contents storage site 113, into which additional information concerning items of information stored at the first storage site 111 can be imported in the form of supplementary information of the items of information stored at the first storage site 111, and an evaluation storage site 114, into which exclusively evaluations of the supplementary information stored at the second storage site 112 can be imported, these being subdivided into positive evaluations of the supplementary information stored at the second storage site 112 and negative evaluations thereof.

A third adding device 180 is provided in this case for the purpose of counting the individual inputted positive evaluations of the supplementary information and a memory is provided for the purpose of saving this number to the second storage site 112, and a fourth adding device 190 is provided for the purpose of counting the individual inputted negative evaluations of the supplementary information and a memory is provided for the purpose of saving this number to the second storage site 112, wherein an individual evaluation can be carried into effect by the users or participants by means of a predefined input, while a positive swarm value of the supplementary information is defined as the number of predefined inputs into the second storage site 112 that correspond to a positive evaluation, and wherein a negative swarm value of the supplementary information is defined as the number of predefined inputs into the second storage site 112 that correspond to a negative evaluation.

The third adding device 180 is adapted so as to add the positive evaluations stored at the second storage site 112 to a third number within time intervals of predefined length as stipulated by a timing device 160, and the fourth adding device 190 is adapted so as to add the negative evaluations stored at the second storage site 112 to a fourth number within the time intervals of predefined length as stipulated by the timing device 160, while a second dividing device 200 is provided so as to state the ratio of the third number to the fourth number in the form of a percentage value.

A second copying device 210 is provided which interprets the supplementary information stored at the second storage site 112 as assured swarm information on determination, in a second decision-making device 170, of a predetermined ratio of positive evaluations to negative evaluations of the supplementary information stored at the second storage site 112, and transfers it to the first storage site 111.

The third adding device 180 and the fourth adding device 190 and also the second dividing device 200 and the second copying device 210 are adapted so as to repeat the currently assigned function on conclusion of the time interval of defined length as stipulated by the timing device 160 in an immediately following time-period of equal length after zeroing the in each case previously ascertained third and fourth numbers.

Figure 3:
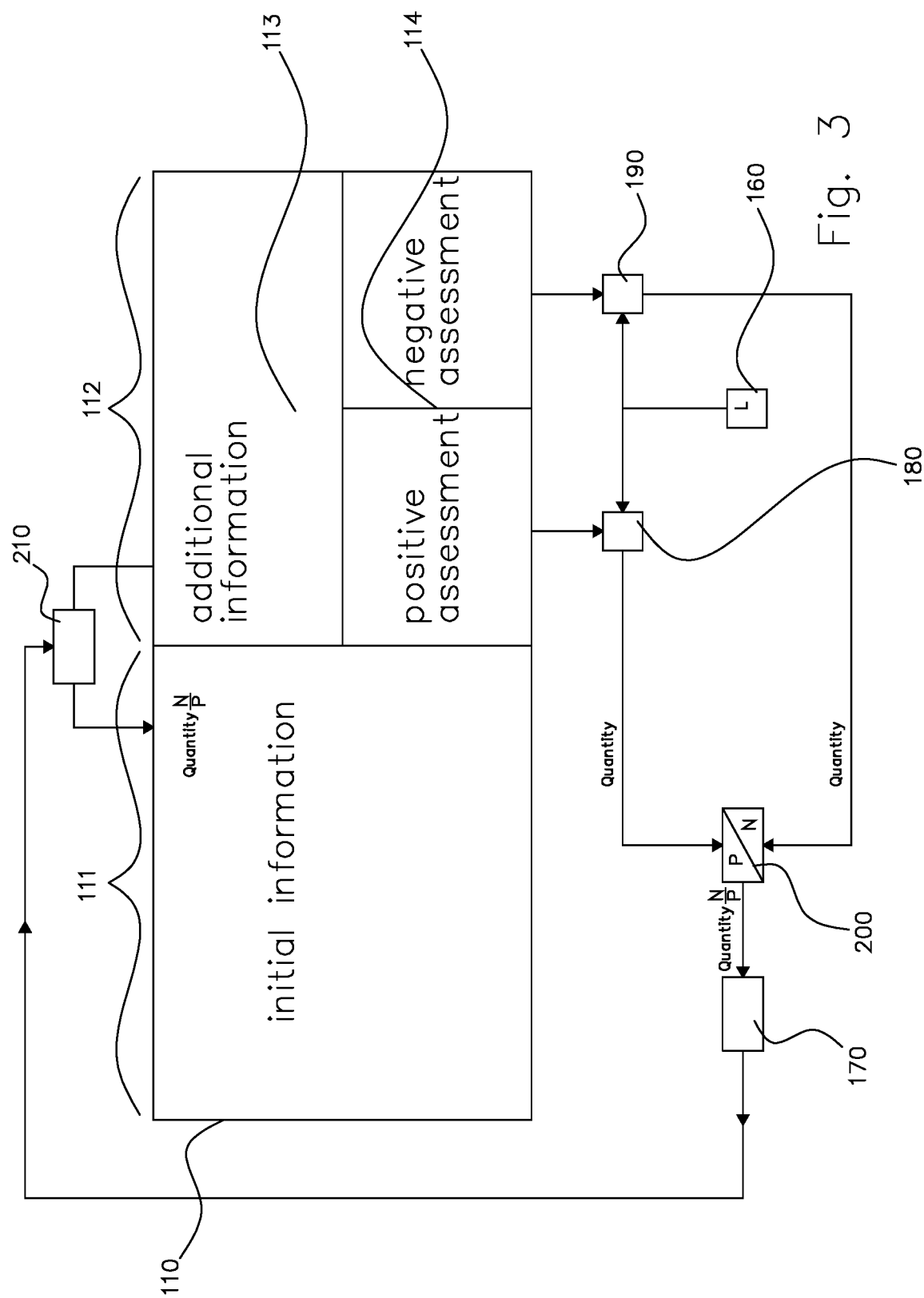
FIG. 3 shows a theoretical embodiment of a dual unit (DuU) that correspond to a second preferred embodiment of the platform device 100 of the invention in the form of a block diagram.

According to the embodiment of the platform device 100 of the invention shown in FIG. 3, the editable second storage site 112 is subdivided into a contents storage site 113, into which additional information concerning items of information stored at the first storage site 111 can be imported in the form of corrective information of the items of information stored at the first storage site 111, and an evaluation storage site 114, into which exclusively evaluations of the corrective information stored at the second storage site 112 can be imported, which are subdivided into positive evaluations of the corrective information stored at the second storage site 112 and negative evaluations of the corrective information stored at the second storage site 112.

A fifth adding device 220 is provided for the purpose of counting the individual inputted positive evaluations of the corrective information and a memory is provided for the purpose of saving this number to the second storage site 112, and a sixth adding device 230 is provided for the purpose of counting the individual inputted negative evaluations of the corrective information, and a memory is provided for the purpose of saving this number to the second storage site 112, and wherein an individual evaluation can be carried into effect by the users or participant by means of a predefined input, while a positive swarm value of the corrective information is defined as the number of predefined inputs into the second storage site 112 that correspond to a positive evaluation, and a negative swarm value of the corrective information is defined as the number of predefined inputs into the second storage site 112 that correspond to a negative evaluation.

The fifth adding device 220 is adapted so as to add the positive evaluations stored at the second storage site 112, on termination of time intervals of predefined length as stipulated by a timing device 160, to a fifth number, and the sixth adding device 230 is adapted so as to add the negative evaluations stored at the second storage site 112, on termination of the time intervals of predefined length, as stipulated by the timing device 160, to a sixth number, wherein a third dividing device 240 is provided so as to state the ratio of the fifth number to the sixth number in the form of a percentage value.

A third copying device 250 is provided, which, on determination, in a third decision-making device 260, of a predetermined ratio of positive evaluations to negative evaluations of the corrective information stored at the second storage site 112, interprets the corrective information stored at the second storage site 112 as being assured swarm information and transfers it to the first storage site 111 and overwrites the previous relevant items of information at the first storage site 111.

The fifth adding device 220 and the sixth adding device 230 and also the third dividing device 240 and the third copying device 250 are adapted so as to repeat the currently assigned function, on conclusion of the time interval of defined length as stipulated by the timing device 160, in an immediately following time-period of equal length after zeroing the in each case previously ascertained fifth and sixth numbers.

In the case of all three of the above embodiments of the platform device 100 of the invention, an input of further items of information relevant to the information stored at the first storage site 111 can be carried into effect successively or simultaneously by the plurality of user-participants.

The exemplary embodiments of the invention explained above merely serve the purpose of acquiring a better understanding of the teaching of the invention claimed in the following claims, which is not restricted, as such, by the exemplary embodiments.

The invention claimed is:

1. A method for operating one or more servers hosting a web-site and networked with a plurality of ID-detectable users or participants wherein:
   the web-site has a platform device collecting and processing items of information stored on a plurality of storage sites in memory by the users or participants;
   the storage sites are subdivided into a plurality of themes formed on the platform by a dual unit (DuU);
   each said dual unit (DuU) comprises:
      a first theme-dependent, non-user-editable storage site that is provided with initial information formulated by an initial participant; and
      a second storage site which is assigned to the first storage site and which the web-site allows to be edited by any of the individual user-participants and is adapted for acceptance of an input of additional information by the plurality of user-participants, as is relevant to the initial information stored at the first storage site;
   the web-site allows the users or participants to place additional information at the editable second storage site in the form of swarm values of the items of information stored at the first storage site;
   the web-site allows an individual evaluation to be carried into effect by the users or participants by means of a predefined input, and wherein a swarm value is defined as the quantitative number of predefined inputs placed by the users or participants in the second storage site;
   the method comprises subdividing the individual evaluations into positive evaluations of the items of information stored at the first storage site and negative evaluations of the items of information stored at the first storage site;
   the method comprises with a first adding device counting the individual inputted positive evaluations and saving this number to the second storage site;
   the method comprises with a second adding device counting the individual inputted negative evaluations and saving this number to the second storage site;
   the web-site allows an individual evaluation to be carried into effect by the users or participants by means of a predefined input, and a positive swarm value is defined as the number of predefined inputs into the second storage site that correspond to a positive evaluation, and a negative swarm value is defined as the number of predefined inputs into the second storage site that correspond to a negative evaluation;
   the method comprises the first adding device adding the positive evaluations stored at the second storage site within time intervals of predefined length as stipulated by a timing device to a first number and the second adding device is adapted so as to add the negative evaluations stored at the second storage site within the time intervals of predefined length as stipulated by the timing device to a second number, wherein a first dividing device is provided so as to state the ratio of the first number to the second number in the form of a percentage value;

the method comprises a first copying device successively interpreting the evaluations stored at the second storage site within settable time intervals as being useful swarm information and transfers it to the first storage site and overwrites the previous relevant items of information at the first storage site; and on conclusion of settable constant time intervals, a timing device transmits reset signals to the first adding device and to the second adding device and also to the first dividing device and to the first copying device so as to set the associated devices to zero, on conclusion of a respective presettable time interval, and to repeat the currently assigned function in an immediately following time-period of equal length.

2. The method as claimed in claim 1, wherein:

the editable second storage site is subdivided into a contents storage site into which additional information concerning items of information stored at the first storage site the web-site allows to be imported in the form of supplementary information of the items of information stored at the first storage site, and an evaluation storage site, into which exclusively evaluations of the supplementary information stored at the second storage site the web-site allows to be imported, said evaluation data being subdivided into positive evaluations of the supplementary information stored at the second storage site and negative evaluations of the supplementary information stored at the second storage site.

3. The method as claimed in claim 2, wherein:

each participant has the possibility of effecting an initial placement of a dual unit having a first storage site and second storage site.

4. The method as claimed in claim 2, wherein:

a third adding device is provided for the purpose of counting the individual inputted positive evaluations of the supplementary information and a memory is provided for the purpose of saving this number to the second storage site, and a fourth adding device is provided for the purpose of counting the individual inputted negative evaluations of the supplementary information and a memory is provided for the purpose of saving this number to the second storage site, wherein the web-site allows an individual evaluation to be carried into effect by the users or participants by means of a predefined input, while a positive swarm value of the supplementary information is defined as the number of predefined inputs into the second storage site that correspond to a positive evaluation, and a negative swarm value of the supplementary information is defined as the number of predefined inputs into the second storage site that correspond to a negative evaluation.

5. The method as claimed in claim 4, wherein:

the third adding device is adapted so as to add the positive evaluations stored at the second storage site within time intervals of predefined length as stipulated by a timing device to a third number and the fourth adding device is adapted so as to add the negative evaluations stored at the second storage site within the time intervals of predefined length as stipulated by the timing device to a fourth number, while a second dividing device is provided so as to state the ratio of the third number to the fourth number in the form of a percentage value.

6. The method as claimed in claim 5, wherein:

a second copying device is provided, which on determination, in a second decision-making device, of a predetermined ratio of positive evaluations to negative evaluations of the supplementary information stored at the second storage site, interprets the supplementary information stored at the second storage site as being assured swarm information and transfers it to the first storage site.

7. The method claimed in claim 6, wherein:

the third adding device and the fourth adding device and also the second dividing device and the second copying device are adapted so as, on conclusion of the time interval of defined length as stipulated by the timing device, to repeat the currently assigned function in an immediately following time-period of equal length after zeroing the previously ascertained third and fourth numbers.

8. The method as claimed in claim 1, wherein:

the editable second storage site is subdivided into a contents storage site, into which additional information concerning items of information stored at the first storage site the web-site allows to be imported in the form of corrective information of the items of information stored at the first storage site, and an evaluation storage site, into which exclusively evaluations of the corrective information stored at the second storage site the web-site allows to be imported, said evaluation data being subdivided into positive evaluations of the corrective information stored at the second storage site and negative evaluations of the corrective information stored at the second storage site.

9. The method as claimed in claim 8, wherein:

a fifth adding device is provided for the purpose of counting the individual inputted positive evaluations of the corrective information and a memory is provided for the purpose of saving this number to the second storage site, and a sixth adding device is provided for the purpose of counting the individual inputted negative evaluations of the corrective information and a memory is provided for the purpose of saving this number to the second storage site, wherein the web-site allows an individual evaluation to be carried into effect by the users or participants by means of a predefined input, while a positive swarm value of the corrective information is defined as the number of predefined inputs into the second storage site that correspond to a positive evaluation, and a negative swarm value of the corrective information is defined as the number of predefined inputs into the second storage site that correspond to a negative evaluation.

10. The method as claimed in claim 9, wherein:

the fifth adding device is adapted so as to add the positive evaluations stored at the second storage site, on termination of time intervals of predefined length as stipulated by a timing device, to a fifth number and the sixth adding device is adapted so as to add the negative evaluations stored at the second storage site on termination of the time intervals of predefined length as stipulated by the timing device to a sixth number, while a third dividing device is provided in order to state the ratio of the fifth number to the sixth number in the form of a percentage value.

11. The method as claimed in claim 10, wherein:

third copying device is provided, which, on determination, in a third decision-making device, of a predetermined ratio of positive evaluations to negative evaluations of the corrective information stored at the second storage site, interprets the corrective information stored at the second storage site as being assured swarm information and transfers it to the first storage site and overwrites the previous relevant items of information at the first storage site.

12. The method as claimed in claim 11, wherein:
the fifth adding device and the sixth adding device and also the third dividing device and the third copying device are adapted so as to repeat the currently assigned function, on conclusion of the time interval of defined length as stipulated by the timing device, in an immediately following time-period of equal length after zeroing the previously ascertained fifth and sixth numbers.

13. The method as claimed in claim 12 wherein:
a predefined input is realized, when there are individual positive evaluations, by the input of the Arabic number +1.

14. The method as claimed in claim 13 wherein:
a predefined input is realized, when there are individual negative evaluations, by the input of the Arabic number −1.

15. The method as claimed in claim 14 wherein:
each participant has the possibility of effecting an initial placement of a dual unit having a first storage site and second storage site.

16. The method as claimed in claim 1, wherein:
a predefined input is realized, when there are individual positive evaluations, by the input of the Arabic number +1.

17. The method as claimed in claim 1, wherein:
a predefined input is realized, when there are individual negative evaluations, by the input of the Arabic number −1.

18. The method as claimed in claim 1, wherein:
each participant has the possibility of effecting an initial placement of a dual unit having a first storage site and second storage site.

19. A method for operating one or more servers hosting a web-site, the web-site comprising a platform device networked with a plurality of ID-detectable users or participants for the purpose of collecting and processing items of information stored on a plurality of theme-dependent storage sites of a platform by the users or participants, characterized in that the storage sites are subdivided into a plurality of themes formed on the platform by a dual unit (DuU), wherein a dual unit (DuU) comprises a first theme-dependent, non-user-editable storage site that is provided with initial information formulated by an initial participant, and also a second storage site which is assigned to the first storage site and which the web-site allows to be edited by any of the individual user-participants and is adapted for acceptance of an input of additional information by the plurality of user-participants, as is relevant to the initial information stored at the first storage site, the method comprising:
receiving from the users or participants additional information placed at the editable second storage site in the form of swarm values of the items of information stored at the first storage site, wherein an individual evaluation is carried into effect by the users or participants by means of a predefined input, and wherein a swarm value is defined as the quantitative number of predefined inputs placed by the users or participants in the second storage site;

subdividing the individual evaluations into positive evaluations of the items of information stored at the first storage site and negative evaluations of the items of information stored at the first storage site, wherein a first adding device counts the individual inputted positive evaluations and a memory saves this number to the second storage site, and a second adding device counts the individual inputted negative evaluations and a memory saves this number to the second storage site, wherein an individual evaluation is carried into effect by the users or participants by means of a predefined input, and a positive swarm value is defined as the number of predefined inputs into the second storage site that correspond to a positive evaluation, and a negative swarm value is defined as the number of predefined inputs into the second storage site that correspond to a negative evaluation;

the first adding device adds the positive evaluations stored at the second storage site within time intervals of predefined length as stipulated by a timing device to a first number and the second adding device adds the negative evaluations stored at the second storage site within the time intervals of predefined length as stipulated by the timing device to a second number, wherein a first dividing device states the ratio of the first number to the second number in the form of a percentage value; and a first copying device successively interprets the evaluations stored at the second storage site within settable time intervals as being useful swarm information and transfers it to the first storage site and overwrites the previous relevant items of information at the first storage site.

20. A method for operating one or more servers hosting a web-site and networked with a plurality of ID-detectable users or participants wherein:
the web-site has a platform device collecting and processing items of information stored on a plurality of code-identifiable and theme-dependent storage sites in memory by the users or participants;
the storage sites are subdivided into a plurality of themes formed on the platform by a dual unit (DuU);
each said dual unit (DuU) comprises:
a first theme-dependent, non-user-editable storage site that is provided with initial information formulated by an initial participant; and
a second storage site which is assigned to the first storage site and which the web site allows to be edited by any of the individual user-participants and is adapted for acceptance of an input of additional information by the plurality of user-participants, as is relevant to the initial information stored at the first storage site;
the editable second storage site is subdivided into:
a contents storage site, into which additional information concerning items of information stored at the first storage site can be imported in the form of supplementary information of the items of information stored at the first storage site; and
an evaluation storage site, into which exclusively evaluations of the supplementary information stored at the second storage site can be imported, said evaluation data being subdivided into positive evaluations of the supplementary information stored at the second storage site and negative evaluations of the supplementary information stored at the second storage site;

a third adding device counts the individual inputted positive evaluations of the supplementary information and saving this counted number to the second storage site;

a fourth adding device counts the individual inputted negative evaluations of the supplementary information and saving this counted number to the second storage site;

the web-site allows an individual evaluation to be carried into effect by the users or participants by means of a predefined input, and a positive swarm value of the supplementary information is defined as the number of predefined inputs into the second storage site that correspond to a positive evaluation, and a negative swarm value of the supplementary information is defined as the number of predefined inputs into the second storage site that correspond to a negative evaluation;

the third adding device is adapted so as to add the positive evaluations stored at the second storage site within time intervals of predefined length as stipulated by a timing device to a third number and the fourth adding device adapted so as to add the negative evaluations stored at the second storage site within the time intervals of predefined length as stipulated by the timing device to a fourth number;

a second dividing device states the ratio of the third number to the fourth number in the form of a percentage value; and on determination, in a second decision-making device, of a predetermined ratio of positive evaluations to negative evaluations of the supplementary information stored at the second storage site, a second copying device interprets the supplementary information stored at the second storage site as being assured swarm information and transfers it to the first storage site.

* * * * *